United States Patent
Brannon et al.

(10) Patent No.: US 8,899,332 B2
(45) Date of Patent: Dec. 2, 2014

(54) METHOD FOR BUILDING AND FORMING A PLUG IN A HORIZONTAL WELLBORE

(75) Inventors: Harold Dean Brannon, Magnolia, TX (US); Harold Gene Hudson, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 387 days.

(21) Appl. No.: 13/302,722

(22) Filed: Nov. 22, 2011

(65) Prior Publication Data
US 2013/0126177 A1 May 23, 2013

(51) Int. Cl.
| | | |
|---|---|---|
| E21B 33/12 | (2006.01) | |
| E21B 43/30 | (2006.01) | |
| C09K 8/68 | (2006.01) | |
| E21B 43/267 | (2006.01) | |
| E21B 33/134 | (2006.01) | |
| E21B 21/00 | (2006.01) | |
| C09K 8/508 | (2006.01) | |

(52) U.S. Cl.
CPC ............... C09K 8/508 (2013.01); E21B 43/305 (2013.01); C09K 8/685 (2013.01); E21B 43/267 (2013.01); E21B 33/134 (2013.01); E21B 21/003 (2013.01)
USPC ..................... 166/308.1; 166/308.5; 166/285; 166/292

(58) Field of Classification Search
CPC ......... C09K 8/508; C09K 8/685; E21B 33/12
USPC .................................... 166/308.1, 308.5, 285
See application file for complete search history.

(56) References Cited

U.S. PATENT DOCUMENTS

| | | | |
|---|---|---|---|
| 4,021,355 A | 5/1977 | Holtmyer et al. | |
| 4,191,249 A | 3/1980 | Sarem | |
| 4,202,795 A | 5/1980 | Burnham et al. | |
| 5,253,711 A | 10/1993 | Mondshine | |
| 5,311,946 A * | 5/1994 | Harry et al. ................. | 166/278 |
| 5,422,183 A | 6/1995 | Sinclair et al. | |
| 5,547,026 A | 8/1996 | Brannon et al. | |
| 5,699,860 A | 12/1997 | Grundmann | |
| 6,059,034 A | 5/2000 | Rickards et al. | |
| 6,330,916 B1 | 12/2001 | Rickards et al. | |
| 6,364,018 B1 | 4/2002 | Brannon et al. | |
| 6,749,025 B1 | 6/2004 | Brannon et al. | |
| 6,772,838 B2 | 8/2004 | Dawson et al. | |
| 7,207,386 B2 | 4/2007 | Brannon et al. | |
| 7,290,614 B2 | 11/2007 | Smith et al. | |
| 7,322,411 B2 | 1/2008 | Brannon et al. | |
| 7,426,961 B2 | 9/2008 | Stephenson et al. | |
| 7,491,682 B2 | 2/2009 | Gupta et al. | |
| 7,493,955 B2 | 2/2009 | Gupta et al. | |
| 7,584,791 B2 | 9/2009 | Robb et al. | |
| 7,598,209 B2 | 10/2009 | Kaufman et al. | |
| 7,735,556 B2 | 6/2010 | Misselbrook et al. | |
| 7,772,163 B1 | 8/2010 | Brannon et al. | |
| 7,913,762 B2 * | 3/2011 | Wheeler et al. ............ | 166/308.2 |
| 7,971,643 B2 | 7/2011 | Brannon et al. | |
| 2005/0194135 A1 | 9/2005 | Nguyen et al. | |
| 2005/0194141 A1 | 9/2005 | Sinclair et al. | |
| 2005/0288190 A1 | 12/2005 | Dao et al. | |
| 2008/0078547 A1 | 4/2008 | Sinclair et al. | |
| 2008/0182761 A1 | 7/2008 | Stephenson et al. | |
| 2009/0149353 A1 | 6/2009 | Dajani et al. | |
| 2009/0149354 A1 | 6/2009 | Dajani et al. | |
| 2011/0028354 A1 | 2/2011 | Le et al. | |
| 2011/0146996 A1 | 6/2011 | Bell et al. | |
| 2011/0220363 A1 | 9/2011 | Gupta | |

OTHER PUBLICATIONS

Steiner, William H.; U.S. Appl. No. 13/076,304 entitled "Well Treatment Composites for Use in Well Treatment Fluids" filed Mar. 30, 2011.
Gupta, D.V. Satyanarayana; U.S. Appl. No. 13/094,186 entitled "Composites for Controlled Release of Well Treatment Agents" filed Apr. 26, 2011.
Darby, et al.; U.S. Appl. No. 12/839,047 "Shaped Compressed Pellets for Slow Release of Well Treatment Agents into a Well and Methods of Using the Same" filed Jul. 19, 2010.
Casey, et al.; U.S. Appl. No. 12/954,413 entitled "Method of Using Gelled Fluids with Defined Specific Gravity" filed Nov. 24, 2010.

* cited by examiner

Primary Examiner — Zakiya W Bates
Assistant Examiner — Silvana Runyan
(74) Attorney, Agent, or Firm — John Wilson Jones; Jones & Smith, LLP

(57) ABSTRACT

A method for building a plug in a horizontal wellbore using a fluid pill containing a suspended well treatment agent. The well treatment agent contains an ultra lightweight (ULW) deformable core and a viscosifying polymer and crosslinking agent coated onto the core. The fluid pill is pumped into the wellbore at the end of a fracturing treatment. The fluid pill is displaced by a displacement fluid and the fluid pill transforms to a thickened gel. The thickened gel is formed by the in-situ reaction of the viscosifying polymer and crosslinking which become disassociated from the ULW deformable core. The gelled fluid containing the ULW deformable core assists in the bridging of the ULW deformable core and forming the bridge plug.

23 Claims, No Drawings

METHOD FOR BUILDING AND FORMING A PLUG IN A HORIZONTAL WELLBORE

FIELD OF THE INVENTION

The present invention relates to an improved method for building a plug in a horizontal wellbore and includes a method of using a fluid pill containing a well treatment agent having an ultra lightweight (ULW) deformable core (onto which is coated a viscosifying polymer and crosslinking agent) to form a fluid-impermeable plug in a horizontal wellbore.

BACKGROUND OF THE INVENTION

Fracturing is a common stimulation method for increasing the production of hydrocarbons from oil, gas and geothermal wells. This method is particularly suitable in the production of fluids and natural gas from low permeability formations. Such reservoirs typically require multiple fractures to reach economic production levels and provide effective drainage. When multiple fractures are required, the casing in a zone of interest, after being perforated and stimulated, must be hydraulically isolated before any new zone of interest can be exploited. Isolation of zones often consists of inserting a mechanical plug, hereinafter referred to as a bridge plug, below the zone of interest. The bridge plug hydraulically isolates that portion of the well from a lower portion (or the rest) of the well. The isolation of the lower zone ensures that high pressure fracturing fluid pumped into the well is directed to the zone of interest. The high pressure fracturing fluid is used to fracture the formation at the open perforations in the casing. The high pressure of the fracturing fluid initiates and then propagates a fracture through the formation.

Wirelines are typically used to run a bridge plug into a vertical well. This method, however, is not effective in horizontal wellbores since treatment fluids (necessary for efficient production of hydrocarbons) are displaced by the bridge plug. While coiled tubing may be used to push and set the bridge plug into a horizontal wellbore, the use of such tubing is time consuming and expensive.

Construction of a sand plug in a horizontal wellbore has further been explored in order to hydraulically isolate a zone from the lower portion of the wellbore. In order to build a sand plug, it is necessary that the end of the fracturing fluid include a pill of fluid containing a greater amount of sand or proppant in comparison to the amount of sand or proppant present in the fracturing fluid. An objective is to have the sand or proppant remain suspended in the fluid pill. The fluid pill is pumped into the well under the fracturing pump rate. The pumping, and thus displacement of the fracturing fluid, is stopped as the fluid pill reaches the perforation tunnels at the zone of interest. During this time, the fluid pill, with high concentration of sand, remains stationary within the wellbore as the fractures are allowed to partially close. Once the fractures are partially closed, displacement of the fluid pill is resumed, normally at a low rate in comparison to the pump rate during the fracturing process. Typically, the rate is set low enough to prevent the fractures from reopening. The fluid pill moves into the perforation tunnels and into the fractures. The high concentration of sand or proppant suspended within the fluid pill screens out against the fractures which are partially closed. Subsequently, the suspended sand in the fluid pill bridges off against the fractures. As the process continues, the sand continues to pack off against the perforation tunnels and eventually the sand packs off against itself creating a sand plug in the wellbore. The slow rate of pumping is continued until the pressure within the wellbore rises indicating that a proper sand plug has been built within the wellbore.

Constructing a sand plug within a horizontal wellbore is difficult since gravitational settling of sand or proppant in the wellbore causes the plug to settle along the bottom of the wellbore which creates a void or channel along the upper side of the wellbore. Isolation of the treated zone is compromised since the displacement fluid passes down the channel and into the fracture without allowing the sand plug to form. Thus, it is necessary in sand plug construction that the fluid pill remain stationary for a time sufficient to keep the sand or proppant suspended in order that fractures in the formation will at least partially close.

U.S. Pat. No. 7,735,556, herein incorporated by reference, discloses a method which remedies the problems associated with insufficient suspended sand or proppant prior to closing of fractures in the formation. This method uses an ultra lightweight (ULW) proppant or neutrally buoyant proppant, in combination with sand, to build a sand plug. The method facilitates multizone fracturing treatments in horizontal wellbores not seen with conventional sand isolation plugs and provides improved isolation between perforated intervals. In the method, a fluid pill containing the ULW proppant or neutrally buoyant proppant is pumped into the wellbore at the end of the fracturing treatment. The fluid pill is pumped down the wellbore until it almost reaches fractures within the zone of interest. The pumping is then ceased or reduced, allowing the fractures to partially close. The ULW proppant remains suspended within the fluid pill while stationary. The pumping is then resumed at a slow rate as a short pump burst. This causes the proppant in the fluid pill to bridge off until a bridge plug is formed.

Methods have been sought for enhancing the wellbore isolation capabilities of the process disclosed in U.S. Pat. No. 7,735,556.

SUMMARY OF THE INVENTION

The present invention provides methods of building a plug within a horizontal wellbore to hydraulically isolate a portion of the wellbore. The method may include pumping a fluid pill into the horizontal wellbore at the tail end of a fracturing treatment used to fracture the formation at a zone of interest, the fluid pill containing a well treatment agent containing an ultra lightweight (ULW) deformable core and a viscosifying polymer and crosslinking agent coated onto the core. In an alternative embodiment, the ULW deformable core may have coated thereon, in addition to the viscosifying polymer and crosslinking agent, other additives such as a crosslinking delaying agent.

A displacement fluid is then pumped down the horizontal wellbore which slowly displaces the fluid pill. The pumping of the displacement fluid down the wellbore is stopped as the pill reaches the zone of interest causing the fluid pill to be stationary within the wellbore. The suspension of pumping in the wellbore allows the fractures at the zone of interest to partially close. After the fractures have partially closed, pumping is resumed, typically at a low rate or as a short pump burst in order to more effectively displace the fluid pill towards the fractures.

Prior to, during or subsequent to pumping of the displacement fluid down the horizontal wellbore, the viscosifying agent and crosslinking agent disassociate from the ULW deformable core. Typically, such disassociation results from the mixing environment in transit through the wellbore and is accelerated by the elevated temperatures within the wellbore. The materials coated onto the core typically rehydrate as they are exposed to water. After or during disassociation, the viscosifying agent and crosslinking agent react to form a highly viscous crosslinked gel.

The ULW deformable core (having disassociated crosslinking agent and viscosifying polymer) remains suspended in the gelled fluid. The gelled fluid containing the deformable core forms the bridge plug. The stiff gelled fluid enhances isolation of the zone of interest in the wellbore and prevents or substantially limits the flow of any subsequently pumped fluids into the zone of interest.

In one embodiment, the ULW deformable core has a larger diameter than the fracturing proppant. The larger diameter of the ULW deformable core promotes the bridging off of the ULW deformable core within the gelled fluid. The continued pumping of the fluid within the wellbore may cause the gelled fluid to bridge off against itself until a plug is formed within the horizontal wellbore.

The use of the well treatment agent described herein renders it unnecessary to separately ship ULW deformable core, viscosifying agent, crosslinking agent, crosslinking delaying agent and other additives to a remote location. In addition, less surface operating area is needed on site to perform the well treatment operation since less space is needed for formulating the well treatment fluid. Further, use of the well treatment agent may save time by reducing the waiting time normally encountered for fracture closure, settling of a sand plug and forming a sufficient seal.

On the surface, the well treatment fluid is prepared by simply adding the well treatment agent to the base fluid to form the fluid pill. The base fluid of the fluid pill may be salt water, fresh water or slickwater.

DETAILED DESCRIPTION OF THE PREFERRED EMBODIMENTS

Illustrative embodiments and methods of the present invention are described below as they might be employed in the use of the well treatment agent to build a sand plug in a horizontal wellbore. In the interest of clarity, not all features of an actual implementation are described in this specification. It will of course be appreciated that in the development of any such actual embodiment or method, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description.

A fluid-impermeable plug is formed in accordance with the method described herein. The term "fluid-impermeable plug" shall refer to a plug which isolates, substantially impairs or prevents the flow of well treating fluids to locations where flow of fluids is not desirable, such as previously stimulated intervals.

A horizontal well, as used herein, refers to any deviated well. These wells can include, for example, any well which deviates from a true vertical axis more than 60 degrees. Those ordinarily skilled in the art having the benefit of this disclosure will understand that all such wells are encompassed by the term "horizontal well."

The fluid-impermeable plug which results from the method described herein hydraulically isolates at least a portion of the horizontal wellbore.

According to an exemplary embodiment of the present invention, after casing has been perforated, fracturing fluid containing a proppant is pumped down the casing under high pressure creating fractures in the well formation at the perforations in the casing. After the fractures are created in the formation, the proppant located in the fracturing fluid enters the fractures and holds the fractures open. The proppant and the fracturing fluid may be any known in the art to be effective in creating or enlarging fractures.

The fluid pill is then pumped into the horizontal wellbore at the tail end of the fracturing treatment. The fluid pill contains a well treatment agent in a base fluid. The base fluid is typically water, brine (including completion brines) or slickwater. The well treatment agent contains a deformable core and at least one viscosifying polymer and at least one crosslinking agent coated onto the core.

The deformable core may be non-porous or porous. Preferred are porous deformable core particulates composed of non-microbial polysaccharides.

Since the core is deformable, the core particulate substantially yields upon application of a minimum threshold level to point to point stress at in situ conditions and do not shatter or break at elevated downhole stresses. The deformable cores for use in the method of the invention may therefore be selected to function in low to moderate stress environments (100 psi to 5,000 psi) as well as moderate to high stress environments (5,000 psi to 15,000 psi).

The diameter of the deformable core is preferably greater than the diameter of a proppant used during fracturing of the wellbore.

Preferred deformable cores include ultra lightweight (ULW) particulates having an apparent specific gravity (ASG) (API RP 60) less than 2.45. Preferred are those ULW particulates having an ASG less than or equal to 2.25, preferably less than or equal to 2.0, more preferably less than or equal to 1.75, even more preferably less than or equal to 1.5, most preferably less than or equal to 1.25.

Suitable deformable cores include naturally occurring materials, such as (a.) chipped, ground or crushed shells of nuts such as walnut, pecan, coconut, almond, ivory nut, brazil nut, etc.; (b.) chipped, ground or crushed seed shells (including fruit pits) of seeds of fruits such as plum, olive, peach, cherry, apricot, etc.; (c.) chipped, ground or crushed seed shells of other plants such as maize (e.g., corn cobs or corn kernels), etc.; and (d.) processed wood materials such as those derived from woods such as oak, hickory, walnut, poplar, mahogany, etc.

An optional protective or hardened material on the deformable core may act to harden and/or isolate or protect the deformable core from adverse formation or wellbore conditions. The protective or hardened material may coat the deformable core entirely or may coat only a portion of the deformable core. The protective or hardened material layer may protect the deformable core from exposure to acids or other workover/drilling fluids, to avoid saturation with liquids, etc. In this regard, any coating material suitable for at least partially protecting or isolating the deformable core may be employed. Examples of such hardening and/or protective materials include, but are not limited to resins like urethanes, phenol formaldehyde resins, melamine formaldehyde resins and urethane resins, low volatile urethane resins), etc. and mixtures thereof.

Methods acceptable for the coating of the deformable core are known in the art. For example, low temperature curing methods may be employed (e.g., using fast setting "cold set" or "cold cure" resins), where heating may be a problem, such as when coating materials which may be sensitive to heat, like ground nuts or fruit pits. Alternatively, indirect heating processes may be employed with such materials when it is necessary to heat a coating material for cure. Low temperature curing resins may be applied with little or no heat, which may be desirable when coating heat-sensitive materials such as wood, nut shell material, etc. Alternatively, heat cured resins may be applied and cured using heating methods that are compatible with heat sensitive materials.

The crosslinking agent, viscosifying agent and other additives, if any, typically disassociate from the deformable core in reverse order to the manner in which they were coated onto the particulate.

Deformable cores may further include such copolymers as polystyrene divinylbenzene terpolymers (including polystyrene/vinyl/divinyl benzene) and acrylate-based terpolymers, and polymers of furfuryl derivatives, phenol formaldehyde, phenolic epoxy resins, polystyrene, methyl methacrylate, nylon, polycarbonates, polyethylene, polypropylene, polyvinylchloride, polyacrylonitrile-butadiene-styrene, polyurethane and mixtures thereof.

The deformable core may further be a multitude of well treatment aggregates agglomerated, bonded or fused together. Included are well treating aggregates composed of deformable organic lightweight material and a weight modifying agent. The ASG of the organic lightweight material is either greater than or less than the ASG of the well treating aggregate depending on if the weight modifying agent is a weighting agent or weight reducing agent, respectively. Exemplary of preferred cores are those particulates set forth in U.S. Pat. No. 7,322,411, herein incorporated by reference. The ASG of the well treating aggregate is generally less than or equal to 2.0, preferably less than or equal to 1.5.

The ASG of the deformable core may be varied according to the fluid used in the fluid loss pill to ensure that the deformable core does not settle out of the fluid pill while it is stationary within the wellbore.

Such deformable cores for use herein are preferably neutrally buoyant.

The viscosifying agent coated onto the deformable core is crosslinkable and may include anionic and nonionic polysaccharides, polyvinyl alcohols, polyacrylates, polyacrylamides and mixtures thereof.

Exemplary of such viscosifying agents are carboxyalkyl cellulose and carboxyalkylhydroxyalkyl cellulose derivatives such as carboxyethylcellulose, carboxymethylcellulose and carboxymethylhydroxyethyl cellulose. Also included are galactomannan gums, such as include non-derivatized guar and derivatized guars like hydroxyalkyl guar and carboxyalkylhydroxyalkyl guar, we well as microbial polysaccharides include xanthan, succinoglycan and scleroglucan. Preferred amongst this group are hydroxypropyl guar and carboxymethylhydroxypropyl guar.

Other suitable viscosifying agents are welan and homo-, block or random polymers containing vinyl alcohol, acrylate, pyrrolidone, 2-acrylamido-2-methylpropane sulfonate, or acrylamide units.

Generally, the amount of viscosifying agent coated onto the deformable core is between from about 0.1 to about 5 wt %, preferably about 0.5 to about 4 weight %, based on the total weight of deformable core and viscosifying agent.

Suitable crosslinking agents coated onto the ULW deformable core include borate ion releasing compounds, organometallic or organic complexed metal ions comprising at least one transition metal or alkaline earth metal ion as well as mixtures thereof. Where the viscosifying agent is guar or hydroxypropyl guar, a borate ion releasing crosslinking agent is preferred.

Typically, the amount of crosslinking agent coated onto the deformable core is between from about 0.001 percent to about 2 percent, preferably from about 0.005 percent to about 1.5 percent, and, most preferably, from about 0.01 percent to about 1.0 percent, based on the total weight of the deformable core, viscosifying agent and crosslinking agent.

Borate ion releasing compounds which can be employed include, for example, any boron compound which will supply borate ions in the fluid upon disassociation from the deformable core. Such compounds include boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. Nos. 3,058,909 and 3,974,077 herein incorporated by reference. In addition, such borate ion releasing compounds include boric oxide (such as selected from $H_3BO_3$ and $B_2O_3$) and polymeric borate compounds. Mixtures of any of the referenced borate ion releasing compounds may further be employed. Such borate-releasers typically require a basic pH (e.g., 8.0 to 12) for crosslinking to occur.

Further preferred crosslinking agents are those, such as organometallic and organic complexed metal compounds, which can supply trivalent or higher polyvalent metal ions into the fluid upon their disassociation from the deformable core. Examples of the trivalent or higher polyvalent metal ions include boron, titanium, zirconium, aluminum, yttrium, cerium, etc. or a mixture thereof. Examples of titanium compounds include titanium ammonium lactate, titanium triethanolamine, titanium acetylacetonate, titanium diisopropoxide bisacetyl aminate, titanium tetra(2-ethyl hexoxide), titanium tetraisopropoxide, titanium di(n-butoxy) bistriethanol aminate, titanium isopropoxyoctylene glycolate, titanium diisopropoxy bistriethanol aminate and titanium chloride. Examples of zirconium salts include zirconium ammonium carbonate, zirconium carbonate, zirconium acetylacetonate, zirconium diisopropylamine lactate, zirconium chloride, zirconium lactate, zirconium lactate triethanolamine, zirconium oxyacetate, zirconium acetate, zirconium oxynitrate, zirconium sulfate, tetrabutoxyzirconium (butyl zirconate), zirconium mono(acetylacetonate), zirconium n-butyrate and zirconium n-propylate. The crosslinking agent may optionally be encapsulated. Examples of typical crosslinking agents include, but are not limited to, those described in U.S. Pat. Nos. 4,514,309 and 5,247,995, which are incorporated herein by reference.

In addition, a crosslinking or viscosification delaying agent may be coated onto the deformable core in order to control, along with the crosslinking agent, viscosification of the fluid. Suitable delayed viscosification agents include salts, such as potassium chloride, sodium chloride and calcium chloride. Further suitable crosslinking or viscosification delaying agents include organic polyols, such as sodium gluconate; sodium glucoheptonate, sorbitol, mannitol, phosphonates, bicarbonate salt, salts, various inorganic and weak organic acids including aminocarboxylic acids and their salts (EDTA, DTPA, etc.) and citric acid and mixtures thereof. Such delaying agents are capable of delaying viscosification to the gel until the downhole temperature is reached which causes the reaction between the viscosifying agent and crosslinking agent. At that point, substantial viscosification of the well treatment composition results.

When present, the amount of crosslinking delaying agent typically coated onto the deformable core is between from about 0.001 percent to about 2 percent based on the total weight of the deformable core and viscosifying agent.

Other additives may also be coated and hardened onto the deformable core. For instance, a base to assist in stabilization of crosslinking may also be hardened onto the deformable core. Suitable stabilizers include those conventionally employed in the art, such as an encapsulated base or in-situ base fluids. Exemplary stabilizers may include, but are not limited, to alkali halides, ammonium halides, potassium fluoride, dibasic alkali phosphates, tribasic alkali phosphates, ammonium fluoride, tribasic ammonium phosphates, dibasic ammonium phosphates, ammonium bifluoride, sodium fluoride, triethanolamine, alkali silicates and alkali carbonates.

Buffering agents may also be adhered to the deformable core in order to maintain the desired pH of the fluid since, in some instances, when the pH of the fluid is too low, degradation of the viscosifying agent may occur. Typical examples of buffering agents include, but are not limited to: sodium phosphate, sodium hydrogen phosphate, boric acid-sodium hydroxide, citric acid-sodium hydroxide, boric acid-borax, sodium bicarbonate, ammonium salts, sodium salts like sodium chloride, potassium salts like potassium chloride, dibasic phosphate, tribasic phosphate, lime, slaked lime, magnesium oxide, magnesium chloride, calcium chloride, basic magnesium carbonate, calcium oxide and zinc oxide.

Buffering agents may also be used to manage pH. For instance, when crosslinking agents are employed, such as borate crosslinking agents, a buffering agent may be used to facilitate the triggering of the crosslinking agent at a pH of 9.0 or higher.

Similarly, biocides, surfactants and corrosion inhibitors designed to prevent emulsion with formation fluids, to reduce surface tension, to enhance load recovery may be hardened onto the deformable core. Further, one or more treatment additives used to control fines or clay swelling or migration such as clay substitutes of the type based on tetramethylammonium chloride, or potassium chloride or polycationic clay control additives, may be hardened onto the deformable core.

Further, a breaker may optionally be coated onto the deformable core. For instance, a breaker capable of delayed reduction of the viscosity of the gelled fluid in-situ, may further be coated onto the deformable core. Such breakers allow the fluid to be easily and effectively removed from the formation and to allow desired material, such as oil or gas, to flow into the wellbore. Such breakers include mild oxidizing agents such as persulfates, percarbonates, perborates, peroxides, perphosphates, permanganates, etc. such as alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate. Additional suitable breaking agents are disclosed in U.S. Pat. Nos. 5,877,127; 5,649,596; 5,669,447; 5,624,886; 5,106,5 6,162,766; and 5,807,812. In addition, enzymatic breakers may also be used. Examples of suitable enzymatic breakers such as guar specific enzymes, alpha and beta amylases, amyloglucosidase, oligoglucosidase, invertase, maltase, cellulase, and hemi-cellulase are disclosed in U.S. Pat. Nos. 5,806,597 and 5,067,566.

When present, the amount of additives referenced above which may be coated onto the deformable core is no greater than from about 0.001 percent to about 2 percent based on the total weight of the deformable core and viscosifying agent.

The crosslinking agent and viscosifying agent, as well as other components desired to be coated onto the deformable core, may be deposited onto the deformable core by being sprayed onto the deformable core and then drying the coated core at a temperature above the boiling point of the coated material(s) but below the decomposition temperature of the viscosifying agent.

Preferably, coating of the deformable core occurs in a fluidized bed where conditions may be attained to drive off water and other volatile liquids. The deformable core is placed in the bottom of the bed which is perforated and which contains an entry port for the introduction of air or gas. As air or gas is introduced into the bed, the crosslinking agent, viscosifying agent and other materials which are desired to be deposited onto the deformable core are introduced, preferably simultaneously, or injected into the bed through different orifices. The deformable core is then coated with coating materials as the deformable core moves from the bottom of the bed and through the perforations. The coated deformable cores are then dried at a temperature between from about 120° F. to about 150° F. while air or gas is blown into the bed in a dehumidified state.

Alternatively, the deformable core may be slurried with the crosslinking agent and viscosifying agent, along with other materials desired to be deposited onto the deformable core, at ambient temperature and pressure. The slurry may then be subjected to an aqueous spray tower to remove the liquids.

In additional to the well treatment agent described herein, the fluid pill may contain one or more conventional proppants, such as sand like Ottawa Sand, bauxite and ceramics. In addition, conventional proppants lighter than sand may also be used. Such a mixture may contain, for example, approximately 30% well treatment agent and approximately 70% proppant (such as, for example, Ottawa Sand) by total plug weight (owing to density differences this yields an approximate 50/50 mix by volume). An alternative exemplary embodiment could use a 15/85 mixture of well treatment agent and conventional proppant by weight.

The pumping of the fluid pill in the wellbore is stopped or the rate of pumping is reduced as the fluid pill approaches the perforations in the casing. At that point, the well treatment agent remains suspended within the fluid pill while the fluid pill is stationary within the wellbore.

The fluid pill needs to remain stationary for a period of time long enough to allow the fractures in the formation to at least partially close sufficiently to ensure particulate bridging. The amount of time needed may vary depending on various factors, including the composition of the formation and various components of the fracturing fluid, such as the type and concentration of polymer in the fracturing fluid, the degree of crosslinking, amount of breaker, volumes of fluid used etc. Various computer models may be used to estimate the fracture closure time after the pumping has stopped as would be appreciated by one of ordinary skill in the art. In an embodiment, the well may be shut-in for 30 minutes or less, preferably from about 10 to about 30 minutes, prior to pumping of the displacement fluid. Use of deformable cores of larger particle size distributions may accelerate, i.e., shorten, the requisite shut-in period.

Once the fractures have partially closed, the displacement fluid is pumped (or displaced via the short pumping burst) and the gelled fluid containing the ULW deformable core continues to bridge off until a plug is built up in the wellbore. A pressure increase results as the displacement fluid continues to be pumped into the wellbore. Once a certain pressure increase is detected, an operator and/or other monitoring means will understand/determine this indicates the wellbore has been hydraulically isolated with the plug. The gelled fluid has a stiffness such that flow of any subsequently pumped fluids into the completed perforated interval is prevented or substantially limited.

In an embodiment, the displacement fluid is the same fluid as the base fluid of the fluid pill. In other instances, the displacement fluid may contain a linear gel in an amount less than or equal to 10 pptg. When using a linear gel in the displacement fluid, the time for settling of the plug may be decreased. The crosslinked gel formed when the crosslinking agent and viscosifying agent disassociate from the deformable core combines with the displacement fluid to yield a crosslinked gel with greater viscosity or stiffness than that of the base fluid of the fluid loss pill or displacement fluid.

In a preferred embodiment, the pumping of the displacement fluid is varied based upon whether fluid pill is comprised only of the well treatment agent or is comprised of a combination of the well treatment agent and conventional proppants. When the fluid pill is comprised of only the well treatment agent, the pumping of displacement fluid is typically resumed at a low rate to slowly displace the fluid pill down the casing. The slow pumping rate of the displacement fluid should be low enough to prevent the fractures from reopening and should be at a rate lower than the pumping rate used during the fracturing process. Where the fluid pill is comprised of the well treatment agent and a conventional proppant, the pumping of displacement fluid may be resumed as a short pumping burst. This pumping burst rate, for example, may be the pumping rate used during fracturing operations. This short pump burst involves bringing the pump rate up from zero to substantially the fracturing rate as quickly as possible for a short duration. Once this is done, a rapid increase in pressure will be observed at the surface if the fluid pill bridges off against the fracture. If no pressure increase is observed, then the fracture has not been plugged and the short pumping burst is repeated. However, once a sufficient pressure increase is observed, the fracture will have been plugged.

The pumping rate can be adjusted based on the size of the casing, the length of the horizontal well and the size of the fluid pill in order to limit the amount of well treatment agent and/or conventional proppant that is dropped out of the fluid pill during placement. Those skilled in the art having the benefit of this disclosure realize there are any variety of computer models and methods by which this adjustment may be accomplished.

The fluid pill is displaced down the horizontal wellbore by displacement fluid pumped down the wellbore. As the fluid pill is slowly displaced (or displaced via a short pumping burst), the viscosifying polymer, crosslinking agent and other additives coated onto the deformable core disassociate from the deformable core of the well treatment agent. A thick gel is formed from the reaction of the viscosifying polymer and crosslinking agent. The plug is formed from the deformable core within the thickened gel.

The thickened gel is displaced towards the perforations in the casing and the fractures in the formation. Since the fractures are already partially closed and full of proppant from the fracturing process, the thickened gel containing the deformable core is at least partially prevented from entering the fractures. This causes the thickened gel to begin to bridge off.

In an exemplary embodiment, a fracturing fluid containing a proppant is introduced into a wellbore to create or enlarge fractures in the formation penetrated by the wellbore. A fluid pill is then introduced into the wellbore. The fluid pill contains the well treatment agent in a base fluid of water, brine or slickwater which may, optionally, contain a conventional linear gel and/or a conventional proppant. The well is then shut-in for a time sufficient to allow the fractures in the formation to at least partially close to ensure bridging. Disassociation of at least a portion of the crosslinking agent and viscosifying agent from the deformable core thickens and the plug begins to form. The displacement fluid is then introduced into the wellbore.

In yet another exemplary embodiment, in order to promote the bridging off of the thickened gel containing the ULW deformable core, the ULW deformable core may be selected having a larger diameter than the diameter of the proppant used in the fracturing fluid. The larger diameter of the ULW deformable core further prevents the entrance of the thickened gel core into the fractures. This, in turn, promotes the thickened gel containing the ULW deformable core to bridge off against itself. Preferably the median diameter of the coated particulates is on the order two times the median diameter of the proppant used in the final stage of the fracturing treatment.

An exemplary method of the present invention includes pumping fluid down the horizontal wellbore to displace a fluid pill located at the tail end of fracturing fluid used to fracture the wellbore. The fluid pill includes the well treatment agent. The concentration of the deformable core in the well treatment agent is higher than the amount of proppant in the fracturing fluid during the fracturing process. The method may further include stopping the pumping of fluid down the wellbore such that the fluid pill is stationary within the wellbore, thereby allowing the at least one fracture at the zone of interest to partially close. The fluid pill may be stationary within the wellbore at a location above a zone of interest, the zone of interest including at least one fracture formed by the fracturing fluid during the fracturing process.

The exemplary method may further include suspending the well treatment agent in the fluid pill while the fluid pill is stationary within the horizontal wellbore, restarting the pumping of the fluid down the horizontal wellbore at a very slow rate or via a short pumping burst to displace the fluid pill after the fluid pill has been stationary within the wellbore and preventing the well treatment agent of the fluid pill from entering the at least one fracture, wherein the thickened gel containing the ULW deformable core bridges off against the wellbore and forms a plug.

In yet another exemplary method, once the fluid pill has been pumped downhole, the pumping rate of the fluid is reduced to a lower pumping rate, instead of completely stopping the pumping rate. This reduction is for a period of time sufficient enough to allow the fracture at the zone of interest to partially close by the time the fluid pill reaches the zone of interest. Upon reaching the zone of interest, the thickened gel (formed from the reaction of viscosifying polymer and crosslinking agent) is slowly displaced into the zone of interest causing the gel to bridge off and form a plug within the wellbore.

The exemplary methods may further include continuing to pump fluid down the wellbore until the pressure rises within the wellbore, thereby indicating the well has been isolated. The method may also include varying the density of the well treatment agent, using an ULW deformable core that has a larger diameter than the diameter of proppant used during the fracturing process, or utilizing a combination of ULW deformable core and conventional fracturing proppant. The method may further include cleaning out the plug from the wellbore, wherein the ULW deformable core of the well treatment agent from the plug remains within the thickened gel during the cleanout process.

In yet another exemplary method, the method includes pumping fluid down a horizontal wellbore to displace a fluid pill down the wellbore. The neutrally buoyant well treatment agent is suspended within the fluid pill as the fluid pill is pumped down the wellbore. The use of the neutrally buoyant well treatment agent may allow the fluid pill to be pumped down coiled tubing and placed at a desired location within a wellbore. The stability of the well treatment agent and neutrally buoyant ULW deformable core allows a fluid pill suspending either of the well treatment agents to be pumped through coiled tubing and into the wellbore without the risk that the ULW deformable core will settle out. Once the fluid pill is within the wellbore, the fluid pill may be slowly displace into the zone of interest as the thickened gel is formed, causing the thickened gel to bridge off and form a plug within the wellbore.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Example 1

A well treating composite having a deformable core particulate and a hardened coating was prepared using, as particulate, LiteProp™ 125, commercially available from Baker Hughes Incorporated, by spraying and drying onto the particulate in sequential steps: (1) 10 lb/Mgal sodium carbonate, (2) 2 lb/gal sodium tetraborate and (3) 40 lb/Mgal guar. The process used a fluid bed coating apparatus having a Glatt coater wherein warm air was blown through the perforated plates below the bed of particulates. The apparatus was operated about at 120° F. to facilitate driving off the water. At times, there was a relatively short period following each spray while the bed was continuing to be fluidized in order to complete drying of a particular stage. A volume of a base fluid (250 ml of 2% KCl) was measured in a beaker and added to a variable speed Waring blender. The desired mass of the untreated particulate and coated particulate was measured using a balance. The Waring blender was turned on and set to a mixing speed of 1,500 RPM and the desired mass of the untreated or treated particulate was added to the base fluid in the blender jar. The samples were mixed in the blender at 1,500 rpm for about 5 minutes, and then transferred to a vessel for viscosity measurement. The additives amounts deposited on the particulate were sufficient for a 4 pound per gallon loading of the composite to deliver 40 lb/Mgal of guar accompanied with the appropriate concentrations of crosslinker and buffer to generate a robust crosslinked fluid.

The viscosities of the slurry compositions were measured using a Brookfield LDV-III Viscometer equipped with a #3 LV CYL cylindrical spindle (Brookfield Engineering Laboratories, Middleboro, Mass.) at a rotational speed of 0.3 rpm, resulting in an apparent shear rate of 0.063 sec−1. Slurry viscosities greater than 2,000,000 cP exceed the measurement capabilities of the instrument using this spindle/rotational speed combination.

| Sample | Concentration | Viscosity @ 0.063 $sec^{-1}$ at 5 min. |
|---|---|---|
| Treated Particulate | 2 ppg | 362,000 cP |
| Untreated Particulate | 4 ppg | 399.8 cP |
| Treated Particulate | 4 ppg | 804,000 cP |
| Untreated Particulate | 6 ppg | 799.8 cP |
| Treated Particulate | 6 ppg | >2,000,000 cP |
| Untreated Particulate | 8 ppg | 4800 cP |
| Treated Particulate | 8 ppg | >2,000,000 cP |

The low shear rate Brookfield viscosities of the slurry samples including the composites exhibited viscosities as much as 2,000 times greater the observed for slurries of the untreated particulate.

Although various embodiments have been shown and described, the invention is not so limited and will be understood to include all such modifications and variations as would be apparent to one skilled in the art. Accordingly, the invention is not to be restricted except in light of the attached claims and their equivalents.

What is claimed is:

1. A method for building a plug in a horizontal wellbore, the method comprising:
    (a) pumping a fracturing fluid into the horizontal wellbore;
    (b) pumping into the wellbore a fluid pill having a well treatment agent suspended therein, the well treatment agent comprising an ultra lightweight (ULW) deformable core and a viscosifying polymer and crosslinking agent coated onto the core, wherein the ULW deformable core has an apparent specific gravity less than 2.45;
    (c) pumping a displacement fluid down the wellbore and displacing the fluid pill further into the wellbore in proximity to a perforation tunnel in a desired location;
    (d) varying the pumping rate of the displacement fluid for a time sufficient for at least one fracture within the horizontal wellbore to at least partially close, the well treatment agent remaining suspended within the fluid pill;
    (e) pumping the displacement fluid down the horizontal wellbore to slowly displace the fluid pill;
    (f) increasing the viscosity of the fluid pill to form a gelled fluid by the in-situ reaction of:
        (i) the crosslinking agent as it is disassociated from the ULW deformable core; and
        (ii) viscosifying polymer disassociated from the ULW deformable core wherein the ULW deformable core is suspended within the gelled fluid; and
    (g) at least partially preventing the gelled fluid containing the suspended ULW deformable core from entering the at least one fracture in the zone, wherein the gelled fluid forms a fluid-impermeable plug within the wellbore.

2. The method of claim 1, the method further comprising the step of continuing to pump the fluid down the wellbore until a pressure rises within the wellbore.

3. The method of claim 1, wherein the ULW deformable core is porous.

4. The method of claim 1, wherein the diameter of the ULW deformable core in the well treatment fluid is greater than the diameter of a proppant used during fracturing of the wellbore.

5. The method of claim 1, further comprising a step of cleaning out the plug from the wellbore, the ULW deformable core remaining suspended during the cleaning.

6. The method of claim 1, wherein the well treatment agent is neutrally buoyant in the fluid pill.

7. The method of claim 1, wherein the fluid pill further contains sand or a ceramic.

8. The method of claim 1, wherein further comprising, prior to step (e), stopping the pumping of the displacement fluid, wherein the fluid pill is stationary within the wellbore.

9. The method of as defined in claim 8, further including the step of varying the density of the ULW deformable core such that the ULW deformable core does not settle out while the fluid pill is stationary.

10. A method for building a plug in a horizontal wellbore comprising:
(a) suspending a well treatment agent within a fluid pill, the well treatment agent comprising an ultra lightweight (ULW) deformable core, a viscosifying agent and a crosslinking agent, wherein the viscosifying agent and crosslinking agent is coated onto the ULW deformable core;
(b) pumping displacement fluid down the wellbore to displace the fluid pill;
(c) allowing at least one fracture in a zone of the horizontal wellbore to partially close;
(d) pumping the displacement fluid down the horizontal wellbore to slowly displace the fluid pill after the at least one fracture in the zone has partially closed;
(e) at least partially preventing the ULW deformable core from entering the at least one fracture in the zone by forming a thickened gel containing the ULW deformable core, wherein the thickened gel is formed by the in-situ reaction of:
 (i) the crosslinking agent as it is disassociated from the ULW deformable core; and
 (ii) viscosifying polymer disassociated from the ULW deformable core; and
(f) forming a fluid-impermeable plug with the thickened gel containing the ULW deformable core within the wellbore.

11. The method of claim 10, wherein the ULW deformable core is porous.

12. The method of claim 10, wherein step (c) further includes the step of reducing a pumping rate of the fluid such that the at least one fracture in the zone partially closes.

13. The method of claim 10, further comprising the step of continuing to pump the displacement fluid down the wellbore until a pressure rises within the wellbore.

14. The method of claim 10, wherein the diameter of the ULW deformable core is greater than the diameter of a proppant used during fracturing of the wellbore.

15. The method of claim 10, further comprising the step of cleaning out the plug from the wellbore, the ULW deformable core remaining suspended during the cleaning.

16. The method of in claim 10, wherein step (c) further includes the step of stopping the pumping of the displacement fluid before the fluid pill reaches the zone, wherein the fluid pill is stationary within the wellbore.

17. The method of claim 16, wherein the well treatment agent remains suspended within the fluid pill while the fluid pill is stationary within the wellbore.

18. A method of using a well treatment agent in forming a plug within a horizontal wellbore, the well treatment agent comprising an ultra lightweight (ULW) deformable core and a viscosifying polymer and crosslinking agent coated onto the core, the method comprising the steps of:
(a) pumping a fluid pill containing the well treatment agent to a location adjacent a zone in the wellbore;
(b) varying the pumping rate of the fluid pill in order to allow a fracture extending from the zone to partially close, the well treatment agent remaining suspended within the fluid pill;
(c) increasing the viscosity of the fluid pill to form a thickened gel by the in-situ reaction of:
 (i) the crosslinking agent as it is disassociated from the ULW deformable core; and
 (ii) viscosifying polymer disassociated from the ULW deformable core; and
(d) plugging the zone with the thickened gel containing the ULW deformable core.

19. The method of claim 18, wherein the ULW deformable core is porous.

20. The method of claim 18, further comprising the step of cleaning out the plug from the wellbore, the ULW deformable core remaining suspended during the cleaning.

21. The method of claim 18, wherein the fluid pill in step (a) is pumped through a coiled tubing.

22. The method of claim 18, further comprising, prior to step (d), applying a short pumping burst to displace the fluid pill after the fracture extending from the zone has partially closed.

23. A method for building a plug in a horizontal wellbore comprising:
(a) suspending a well treatment agent within a fluid, the well treatment agent comprising a ultra lightweight (ULW) deformable core and a viscosifying polymer and crosslinking agent coated onto the core;
(b) displacing the fluid pill;
(c) allowing at least one fracture in a zone of the horizontal wellbore to partially close;
(d) continuing to displace the fluid pill after the at least one fracture in the zone has partially closed, wherein a gelled fluid containing the ULW deformable core bridges off forming a plug within the wellbore; and
further wherein during displacement of the fluid pill, the thickened gel is formed by the in-situ reaction of:
 (i) the crosslinking agent after being disassociated from the ULW deformable core; and
 (ii) viscosifying polymer after being disassociated from the ULW deformable core.

* * * * *